United States Patent
Tezuka et al.

(10) Patent No.: US 11,681,037 B2
(45) Date of Patent: Jun. 20, 2023

(54) VEHICLE LAMP

(71) Applicant: Koito Manufacturing Co., Ltd., Tokyo (JP)

(72) Inventors: Nobutaka Tezuka, Shizuoka (JP); Yuichi Watano, Shizuoka (JP); Shigeyuki Watanabe, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 463 days.

(21) Appl. No.: 16/720,170

(22) Filed: Dec. 19, 2019

(65) Prior Publication Data
US 2020/0209385 A1    Jul. 2, 2020

(30) Foreign Application Priority Data
Dec. 28, 2018   (JP) .................. 2018-247870

(51) Int. Cl.
*G01S 13/931*    (2020.01)
*F21S 41/663*    (2018.01)
*B60Q 1/00*      (2006.01)

(52) U.S. Cl.
CPC .......... *G01S 13/931* (2013.01); *B60Q 1/0023* (2013.01); *F21S 41/663* (2018.01); *G01S 2013/93277* (2020.01)

(58) Field of Classification Search
CPC ......... G01S 13/931; G01S 2013/93277; B60Q 1/0023; B60Q 2400/40; B60Q 2400/50; B60Q 1/0041; B60Q 1/50; B60Q 1/507; B60Q 1/543; F21S 41/663; F21S 41/28; F21S 43/14; F21S 43/27; F21S 43/26
See application file for complete search history.

(56) References Cited

U.S. PATENT DOCUMENTS

| 6,367,950 | B1 * | 4/2002 | Yamada | F21S 43/249 362/241 |
| 6,441,943 | B1 * | 8/2002 | Roberts | F21S 43/14 359/522 |
| 2003/0067787 | A1 * | 4/2003 | Serizawa | B60Q 1/302 362/508 |
| 2008/0158045 | A1 * | 7/2008 | Teranishi | B60Q 1/076 342/70 |

(Continued)

FOREIGN PATENT DOCUMENTS

| DE | 102016008338 A1 * | 2/2017 |
| JP | 2017-59404 A | 3/2017 |

(Continued)

OTHER PUBLICATIONS

An Office Action dated Oct. 11, 2022, issued from the Japanese Patent Office (JPO) of Japanese Patent Application No. 2018-247870 and a Machine translation thereof (8 pages).

*Primary Examiner* — Timothy X Pham
(74) *Attorney, Agent, or Firm* — Venjuris, P.C.

(57) ABSTRACT

A vehicle lamp includes a lamp chamber, an automatic operation marker lamp unit, and a sensor device. The lamp chamber includes a lamp body and an outer lens, and the automatic operation marker lamp unit and the sensor device are integrated in the lamp chamber. The automatic operation marker lamp unit informs surroundings that a vehicle is being driven automatically, and a sensor device detects information around the vehicle.

5 Claims, 9 Drawing Sheets

(56) References Cited

U.S. PATENT DOCUMENTS

| | | | | |
|---|---|---|---|---|
| 2008/0180965 | A1* | 7/2008 | Nakamura | B60Q 1/0023 |
| | | | | 362/507 |
| 2017/0158111 | A1* | 6/2017 | Zawacki | B60Q 1/2607 |
| 2018/0163941 | A1* | 6/2018 | Lee | B60Q 1/007 |
| 2018/0304807 | A1* | 10/2018 | Boesch | G08G 1/0965 |
| 2020/0174100 | A1* | 6/2020 | Hori | F21S 45/47 |

FOREIGN PATENT DOCUMENTS

| | | |
|---|---|---|
| WO | 2017/073634 A | 5/2017 |
| WO | 2017/073635 A | 5/2017 |

* cited by examiner

VEHICLE LAMP

CROSS-REFERENCE TO RELATED APPLICATIONS

This application is based on and claims priority from Japanese Patent Application No. 2018-247870, filed on Dec. 28, 2018, with the Japan Patent Office, the disclosure of which is incorporated herein in its entirety by reference.

TECHNICAL FIELD

The present disclosure relates to a vehicle lamp mounted on an automatic driving vehicle.

BACKGROUND

A research on an automatic driving technology of a vehicle is actively being conducted in many countries, and legislation to enable vehicles to travel on public roads in an automatic driving mode (e.g., a self-driving mode) is being studied in various countries. Levels 0 to 5 are defined for the automatic driving, and generally, level 3 or higher is defined as the automatic driving. Level 3 is referred to as a conditional automatic driving, in which an automatic system operates everything at a specific location, and a driver operates in an emergency. Level 4 is referred to as a highly automatic driving, in which the automatic system recognizes traffic conditions only in a specific location such as an expressway and performs all operations related to driving in the specific location. Level 5 is referred to as a fully automatic driving, in which the automatic system recognizes traffic conditions and performs all operations related to driving without being limited by the locations. See, for example, International Publication Pamphlet No. WO 2017/073634.

SUMMARY

The present disclosure has been made in consideration of the circumstances, and the present disclosure is to provide a vehicle lamp suitable for an automatic driving vehicle.

In order to solve the above problems, the vehicle lamp according to an aspect of the present disclosure is a vehicle lamp including a lamp chamber including a lamp body and an outer lens, an automatic driving marker lamp unit configured to inform the surroundings that a vehicle is being driven automatically, and a sensor device configured to detect information around the vehicle, in which the automatic driving marker lamp and the sensor device are integrated in the lamp chamber.

The sensor device may be a millimeter wave radar.

A light guide disposed to cover the front side of the millimeter wave radar may further be provided.

The light guide may be configured to receive and emit light leaked from another lamp unit disposed in the lamp chamber.

According to the present disclosure, it is possible to provide a vehicle lamp which suitable for an automatic driving vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
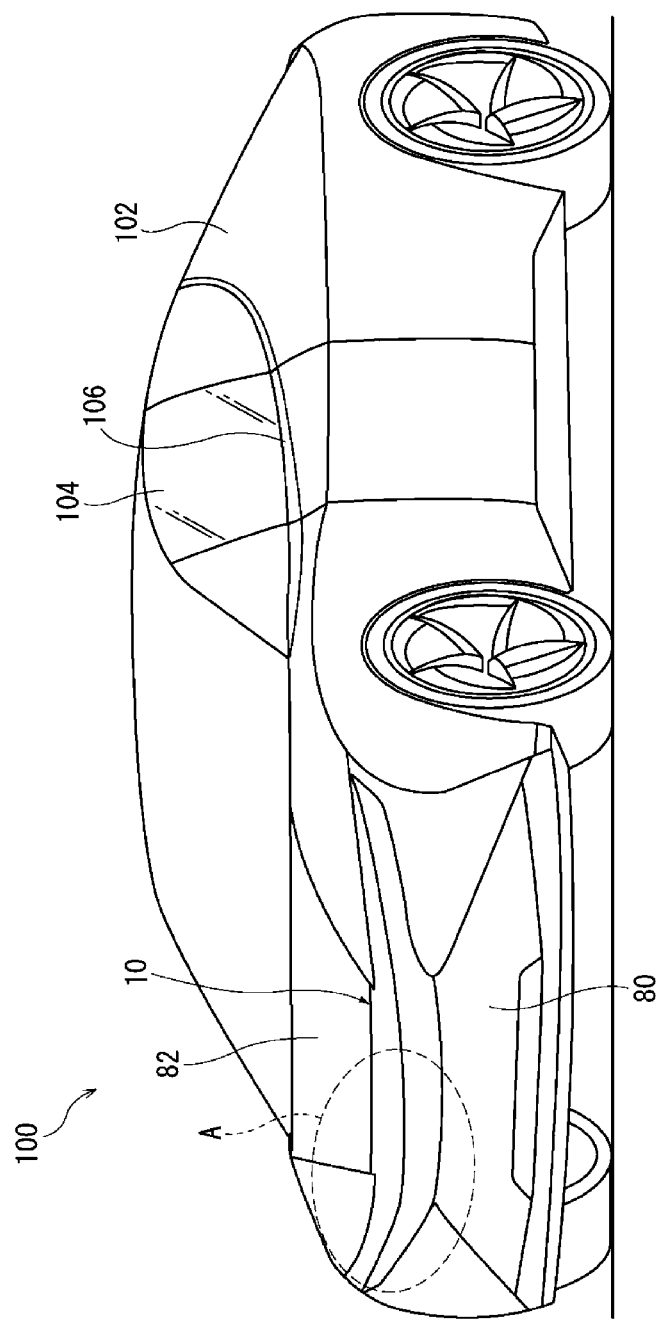
FIG. 1 is a schematic view illustrating a vehicle on which a vehicle lamp according to an embodiment of the present disclosure is mounted.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, a vehicle lamp according to an embodiment of the present disclosure will be described in detail with reference to the drawings. Since each of the drawings is provided to explain a positional relationship of each member, it is not necessary to represent an actual dimensional relationship of each member. Further, in the description of each embodiment, the same or corresponding elements are denoted by the same reference numerals and redundant explanation will be properly omitted.

FIG. 1 is a schematic view of a vehicle 100 on which a vehicle lamp 10 according to an embodiment of the present disclosure is mounted. The vehicle 100 is a personally owned vehicle (POV) corresponding to the automatic driving at level 3. The vehicle lamp 10 is a head lamp provided at the front portion of the vehicle 100.

Figure 2:
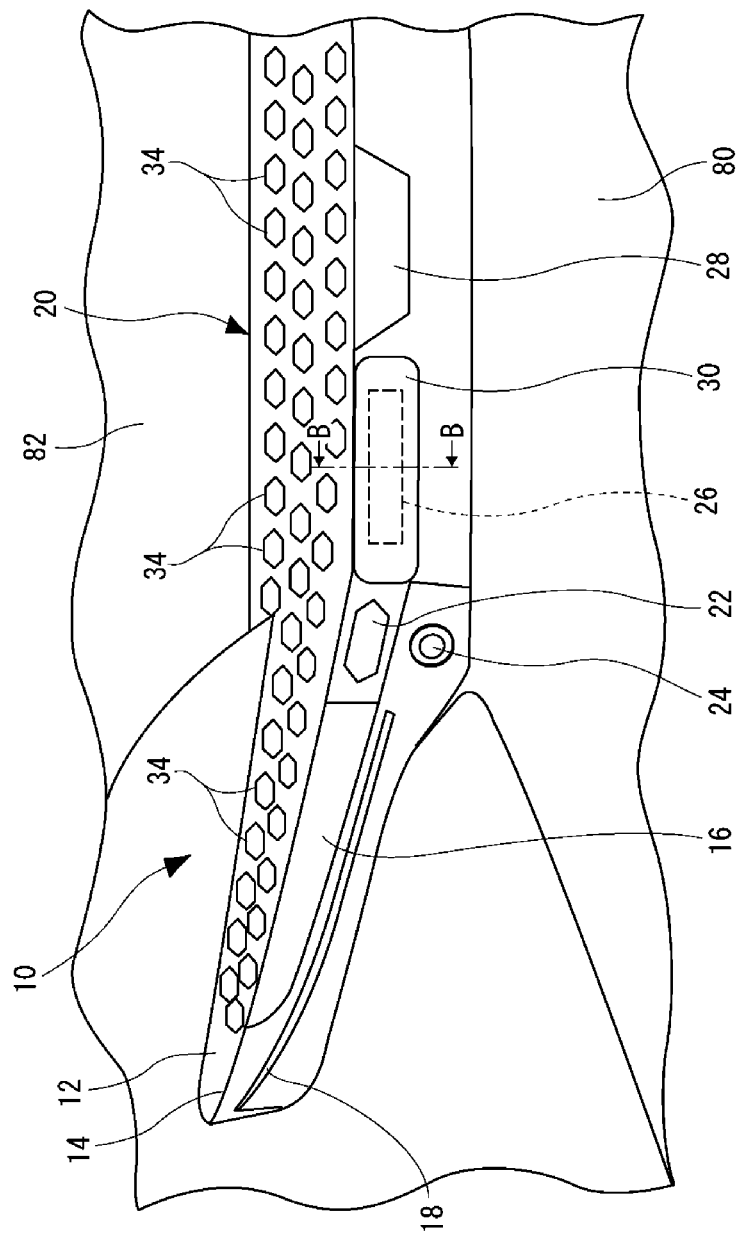
FIG. 2 is a schematic front view illustrating portion A of the vehicle lamp illustrated in FIG. 1.

FIG. 2 is a schematic front view illustrating portion A (a portion from the central portion to the left toward the vehicle) of the vehicle lamp 10 illustrated in FIG. 1. The vehicle lamp 10 includes a lamp body 12 and a transparent outer lens 14 disposed on the front side of the lamp of the lamp body 12. The lamp body 12 and the outer lens 14 form a lamp chamber.

In the lamp chamber, a lamp and a sensor device that detects information around the vehicle are disposed. As the lamp, a head lamp 16 capable of irradiating a high beam and a low beam, a turn signal lamp 18, an automated driving (AD) marker lamp 20 configured to inform the surroundings that the vehicle is being driven automatically, and a road surface drawing lamp 22 are included. The head lamp 16 or the turn signal lamp 18 may use an LED. The road surface drawing lamp 22 may be a digital mirror device (DMD). As the sensor device, a camera 24, a millimeter wave radar 26, and a light detection and ranging (LiDAR) 28 are included. In the vehicle lamp 10 according to the embodiment, the plurality of lamps and the plurality of sensor devices are integrated in the lamp chamber. In an automatic driving vehicle, it is required to properly recognize surrounding circumstances such as moving objects and road shapes around the vehicle. Further, a function which informs the surroundings that the vehicle is an automatic driving vehicle is necessary. According to the vehicle lamp 10 according to the embodiment, in addition to the head lamp 16 which irradiates low beam or high beam, the automatic driving marker lamp 20 and various sensor devices are integrated, and thus, it is possible to implement a vehicle lamp suitable for an automatic driving vehicle.

In the embodiment, as illustrated in FIG. 2, the automatic driving marker lamp 20 is disposed in a straight line in the vehicle width direction, and the LiDAR 28, the millimeter wave radar 26, the road surface drawing lamp 22, and the head lamp 16 are disposed in this order from the center to the left toward the vehicle, below the automatic driving marker lamp 20. Further, the camera 24 is disposed below the road surface drawing lamp 22, and the turn signal lamp 18 is disposed below the head lamp 16. The same applies from the center of the vehicle to the right. However, such arrangements are examples, and are not limited thereto.

Figure 3:
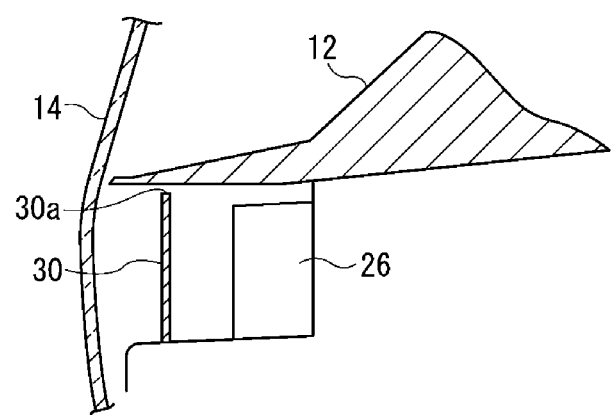
FIG. 3 is a schematic cross-sectional view taken along line B-B of the vehicle lamp illustrated in FIG. 2.

FIG. 3 is a schematic cross-sectional view taken along line B-B of the vehicle lamp 10 illustrated in FIG. 2. As illustrated in FIG. 3, the millimeter wave radar 26 is disposed in the lamp chamber formed by the lamp body 12 and the outer lens 14. The vehicle lamp 10 according to the embodiment includes a light guide 30 disposed to cover the front side of the millimeter wave radar 26. The light guide 30 includes a light incident portion 30a at the upper end thereof. Light leaked from the automatic driving marker 20 or the road surface drawing lamp 22 is incident from the light incident portion 30a into the light guide and emitted from the light guide 30. In this manner, by covering the front side of the millimeter wave radar 26 with the light guide 30 and emitting light, the presence of the millimeter wave radar 26 may be hidden and the appearance may be improved.

As illustrated in FIG. 2, the automatic driving marker lamp 20 includes a plurality of light emitting units 34. The plurality of light emitting units 34 are regularly arranged in the lamp chamber. Each of the light emitting units 34 emits light in a turquoise color.

Figure 4:
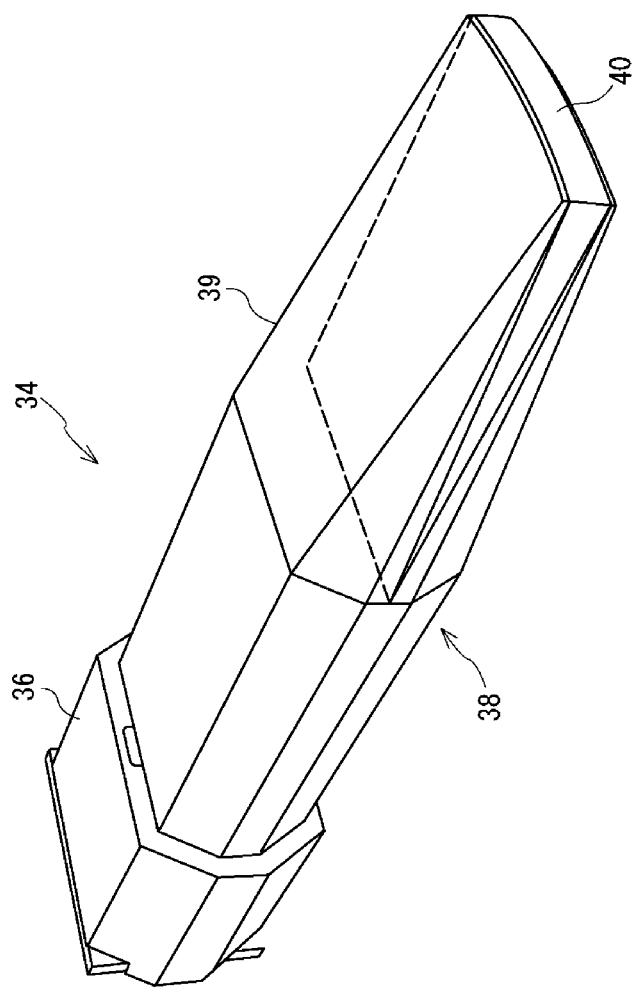
FIG. 4 is a schematic perspective view of a light emitting unit.

FIG. 4 is a schematic perspective view of the light emitting unit 34. The light emitting unit 34 includes a base 36, an LED which is provided inside the base 36 and emits light in the turquoise color, and a lens 38 which controls the light from the LED. The lens 38 includes a lens body 39 made by a transparent member, and a turquoise-colored plate-like lens 40 embedded in a part of the lens body 39. The lens body 39 and the plate-like lens 40 constitute an integrated lens. By using such lens 38, the lens 38 is appeared in the turquoise color even when the LED is turned off, and thus, it is possible to inform the surroundings that the vehicle 100 is an automatic driving vehicle.

Figure 5:
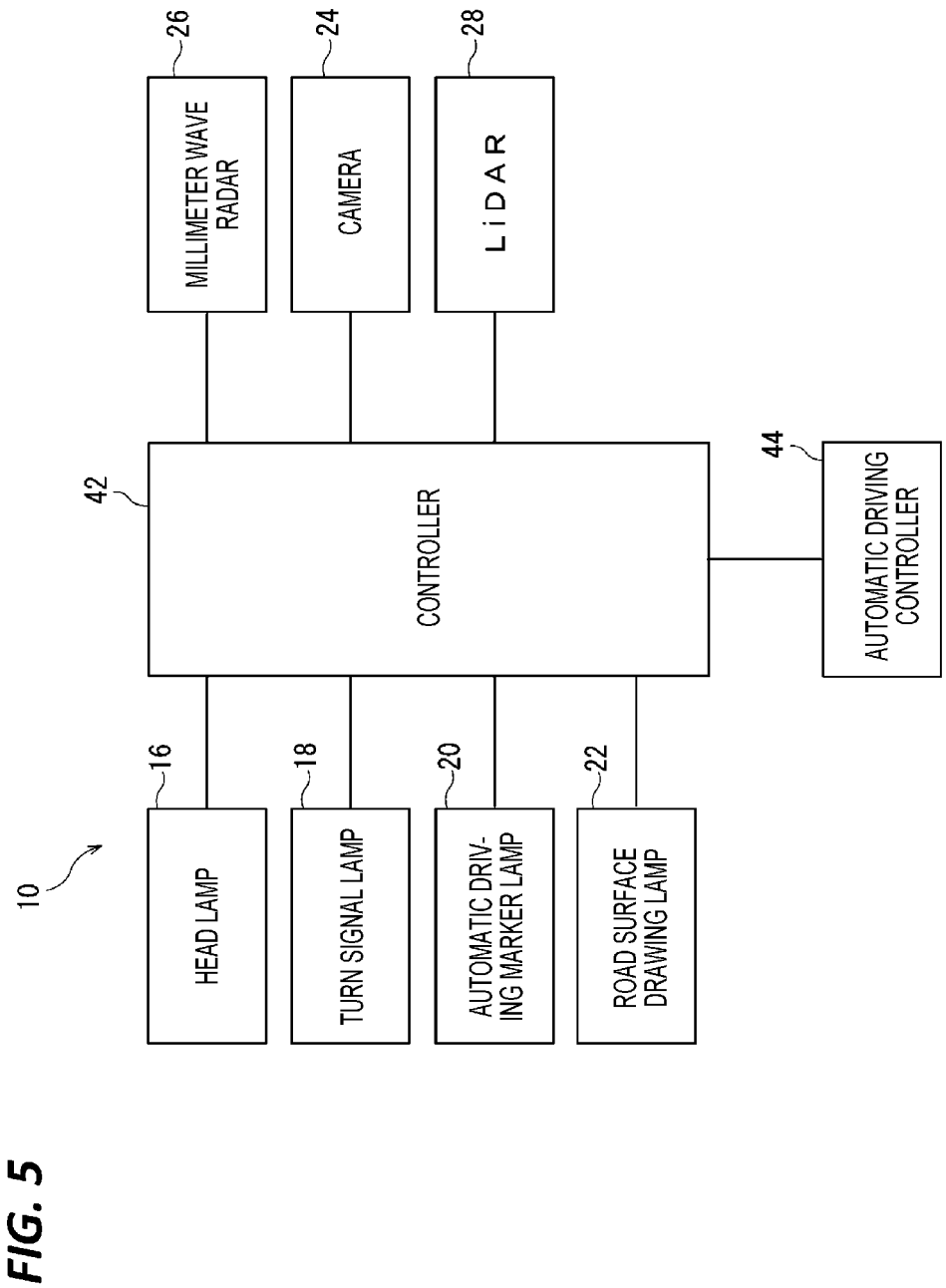
FIG. 5 is a functional block diagram for explaining the vehicle lamp according to the embodiment of the present disclosure.

FIG. 5 is a functional block diagram for explaining the vehicle lamp 10 according to the embodiment of the present disclosure. As illustrated in FIG. 5, the vehicle lamp 10 includes the head lamp 16 as a lamp, the turn signal lamp 18, the automatic driving marker lamp 20, and the road surface drawing lamp 22. Further, the vehicle lamp 10 includes the millimeter wave radar 26, the camera 24, and the LiDAR 28 as a sensor device. The vehicle lamp 10 include a controller 42 connected to the lamp and the sensor device. The controller 42 may be disposed inside the lamp body 12 of the vehicle lamp 10, or may be disposed outside the lamp body 12.

As illustrated in FIG. 5, the controller 42 may be connected to an automatic driving controller 44 included in the vehicle 100. The controller 42 acquires information on whether or not the vehicle 100 is being driven automatically from the automatic driving controller 44, and causes the automatic driving marker lamp 20 to emit light in the turquoise color while performing the automatic driving.

The camera 24 captures the surroundings of the vehicle, and sends the captured image to the controller 42. The controller 42 performs image recognition of a person around the vehicle from the image captured by the camera 24, and detects that an occupant registered in advance is around the vehicle. Since the detection is performed using the image, it is possible to detect a direction in which the occupant is present as viewed from the camera 24. In order to increase the detection accuracy, the millimeter wave radar 26 or the LiDAR 28 may be used in addition to the camera 24.

Figure 6:
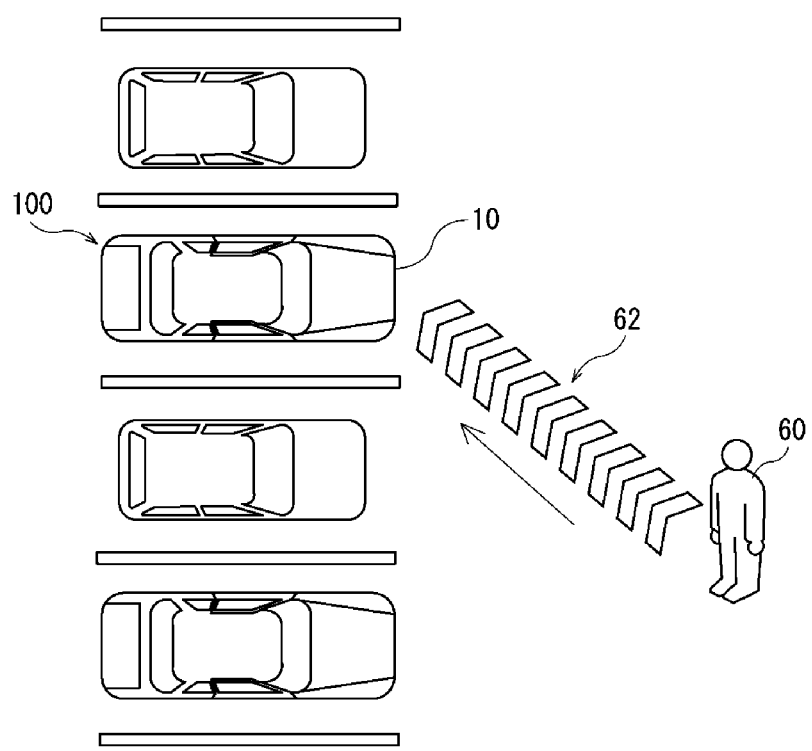
FIG. 6 is a view illustrating an example of a road surface drawing by a road surface drawing lamp.

FIG. 6 illustrates an example of a road surface drawing by the road surface drawing lamp 22. FIG. 6 illustrates a situation in which an occupant 60 is heading for the vehicle 100 parked in a parking lot. When the occupant 60 is detected around the vehicle 100, the controller 42 controls the road surface drawing lamp 22 to draw a sequential pattern 62 onto the road surface around the vehicle toward the direction in which the detected occupant 60 is present. The sequential pattern is an irradiation pattern which turns on serially, and for example, a pattern continuously drawn onto the road surface toward the vehicle 100 from a location in the vicinity of the occupant 60. It is possible to produce "welcome" for the occupant 60 who returns to the vehicle 100, by drawing such sequential pattern onto the road surface. According to the vehicle lamp 10 according to the embodiment, it is possible to communicate with the occupant in this manner.

The controller 42 may cause another lamp which is different from the road surface drawing lamp 22, for example, the automatic driving marker lamp 20 to emit light sequentially in conjunction with the road surface drawing lamp 22. Since the road surface drawing lamp 22 includes the plurality of light emitting units 34 which emit light in the turquoise color, an innovative sequential light emission is possible, and thus, it is possible to produce more impressive "welcome" to the occupant 60. The expression "the automatic driving marker lamp 20 is in conjunction with the road surface drawing lamp 22" may signify that, for example, the sequential light emission of the automatic driving marker lamp 20 is started after the road surface drawing of the sequential pattern by the road surface drawing lamp 22 is finished. Alternatively, the sequential light emission of the automatic driving marker lamp 20 may be performed during the drawing of the sequential pattern by the road surface drawing lamp 22.

In addition to or in place of the road surface drawing lamp 22, the head lamp 16 or the turn signal lamp 18 may be in conjunction with the road surface drawing lamp 22 to emit light sequentially.

Figure 7:
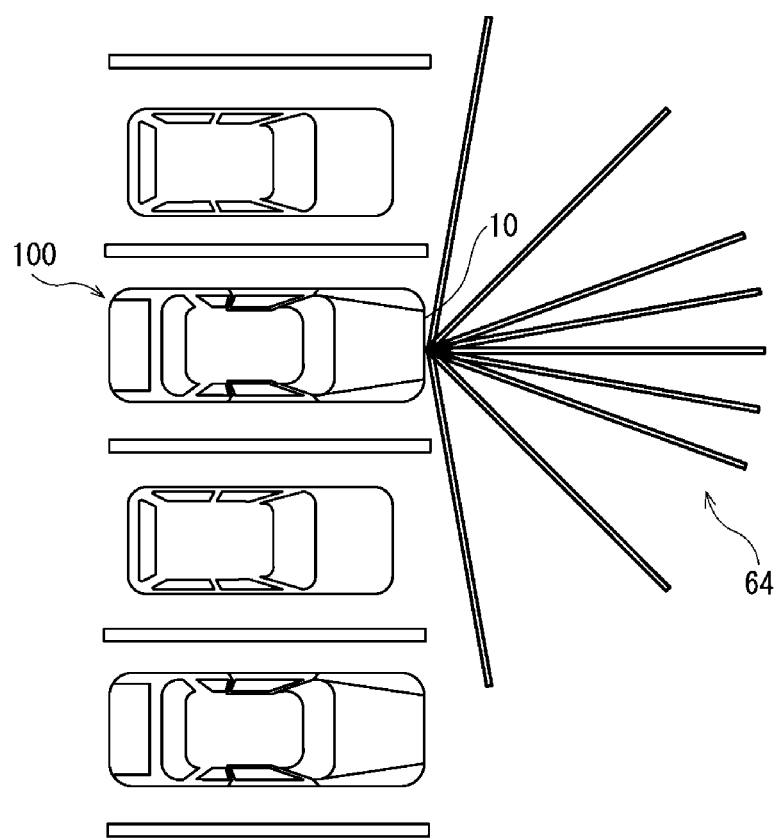
FIG. 7 is a view illustrating another example of a road surface drawing by the road surface drawing lamp.

FIG. 7 illustrates another example of a road surface drawing by the road surface drawing lamp 22. FIG. 7 illustrates a situation in which an occupant is not present around the vehicle 100. When the occupant 60 is not detected around the vehicle 100, the controller 42 controls the road surface drawing lamp 22 to draw a sequential pattern 64 onto the area which is capable of being irradiated around the vehicle. It is possible to produce "welcome" for a person around the vehicle 100, by drawing such sequential pattern onto the road surface.

Figure 8:
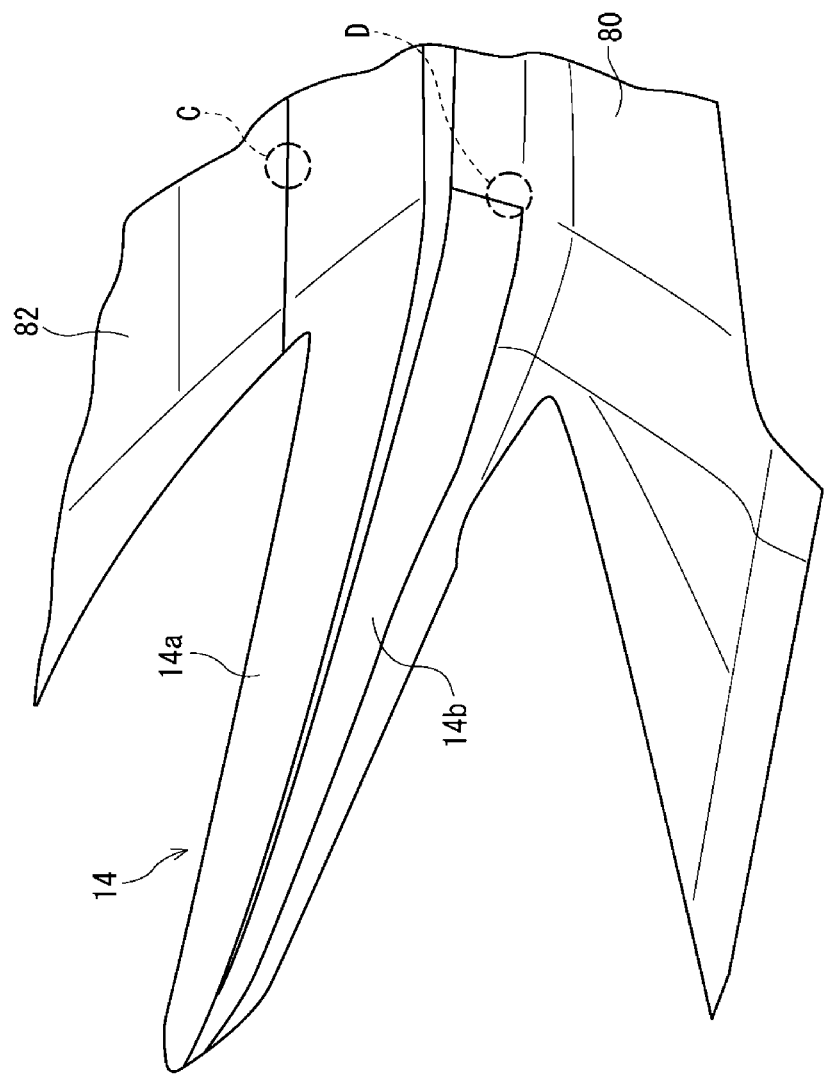
FIG. 8 is a schematic view illustrating a part of an outer lens.

FIG. 8 is a schematic view illustrating a part of the outer lens 14. The outer lens 14 includes an outer lens 14a for the automatic driving marker lamp 20, and an outer lens 14b for the head lamp 16, the turn signal lamp 18, and the road surface drawing lamp 22. In the embodiment, such outer lenses 14a and 14b are made by a resin member, integrally with a front panel 80 and a bonnet 82. The weight reduction of the vehicle 100 may be promoted by using such an integrally molded product made of a resin member.

Figure 9:
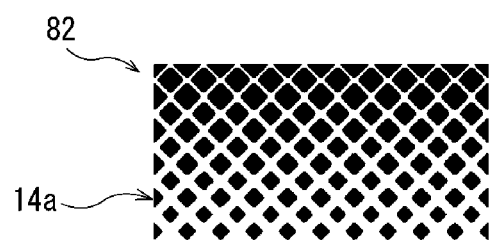
FIG. 9 is a schematic view illustrating a boundary portion between the outer lens and a bonnet.

FIG. 9 is a schematic view illustrating a boundary portion between the outer lens 14a and a bonnet 82. The outer lenses 14a and 14b are transparent, and the bonnet 82 or the front panel 80 is colored. Therefore, a boundary line (cutting line) is generated in the boundary portion (portion C in FIG. 8) between the outer lens 14a and the bonnet 82, or the boundary portion (portion D in FIG. 8) between the outer lens 14b and the front panel 80. In the embodiment, as illustrated in FIG. 8, the boundary line is made inconspicuous by providing gradation in color of the boundary portion. Therefore, it is possible to implement an innovative design in which the sense of unity between the vehicle lamp 10 and the vehicle 100 is improved.

Returning to FIG. 1, in the vehicle 100 according to the embodiment, a linear light guide 106 is disposed in the boundary portion between a body 102 and a side window 104. The light guide 106 is configured to emit light in the turquoise color. By disposing such a light guide 106, it is possible to inform the side of the vehicle 100 that the vehicle 100 is being driven automatically, and thus, safety may be improved.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
    a lamp chamber including a lamp body and an outer lens;
    a marker lamp extending along a width direction of a front side of a vehicle and configured to inform surroundings that the vehicle is being driven automatically; and
    a plurality of sensors configured to detect information around the vehicle and including a millimeter wave radar, a LiDAR, and a camera;
    a light guide configured to cover a front side of the millimeter wave radar,
    wherein the marker lamp and the plurality of sensors are integrated in the lamp chamber in the front side of the vehicle, and
    the light guide is disposed adjacent to the marker lamp and configured to receive and emit light leaked from the marker lamp, thereby hiding existence of the millimeter wave radar while emitting the light.

2. The vehicle lamp according to claim 1, wherein the light guide includes a light incident portion into which the light leaked from the marker lamp is incident, at an upper end of the light guide.

3. The vehicle lamp according to claim 1, wherein the marker lamp includes a plurality of light emitters that is regularly arranged along the width direction of the front side of the vehicle, and
    each of the plurality of light emitters includes a base, an LED that is provided inside the base and emits light in a turquoise color, and a lens that passes the light from the LED.

4. The vehicle lamp according to claim 3, wherein the lens includes a lens body made by a transparent member and a turquoise-colored plate-like lens embedded in a portion of the lens body.

5. The vehicle lamp according to claim 1, further comprising:
    a drawing lamp configured to, when an occupant is detected around the vehicle, draw a sequential pattern onto a road surface around the vehicle toward a direction in which the detected occupant is present,
    wherein the marker lamp, the drawing lamp, and the plurality of sensors are integrated in the lamp chamber in the front side of the vehicle,
    the outer lenses include a first outer lens for the marker lamp and a second outer lens for the drawing lamp, and
    the first outer lens and the second outer lens are made by a resin member, integrally with a front panel and a bonnet of the vehicle.

* * * * *